United States Patent [19]
Veltman

[11] Patent Number: 5,259,301
[45] Date of Patent: Nov. 9, 1993

[54] SINGLE SPIRAL ROTARY BATCH RETORT

[75] Inventor: Joost Veltman, Aptos, Calif.

[73] Assignee: FMC Corporation, Chicago, Ill.

[21] Appl. No.: 893,189

[22] Filed: Jun. 3, 1992

[51] Int. Cl.⁵ .............................................. A23L 3/06
[52] U.S. Cl. ........................................ 99/365; 99/362;
99/371; 422/308; 422/309; 422/26
[58] Field of Search ................. 422/26, 307, 308, 309;
99/365, 362, 371

[56] References Cited

U.S. PATENT DOCUMENTS

| | | | |
|---|---|---|---|
| 1,742,244 | 1/1930 | Gardner | 99/365 |
| 1,939,372 | 12/1933 | Thompson | 99/365 |
| 2,436,913 | 3/1948 | Bourland | 99/365 |
| 2,695,556 | 11/1954 | Novotny | 99/365 |
| 3,510,320 | 5/1970 | Reimers | 99/365 |
| 3,532,049 | 10/1970 | Smith | 99/371 |
| 3,805,949 | 4/1974 | Engdahl et al. | 99/365 |
| 3,815,490 | 6/1974 | Barney, Jr. et al. | 99/365 |

Primary Examiner—Robert J. Warden
Assistant Examiner—Hien Tran
Attorney, Agent, or Firm—Michael Lee; R. C. Kamp; R. B. Megley

[57] ABSTRACT

A steritort with a single spiral which allows the automatic loading of several rows of containers, the simulation of a rotary retort, and an indexed unloading of the containers by a push rod.

16 Claims, 5 Drawing Sheets

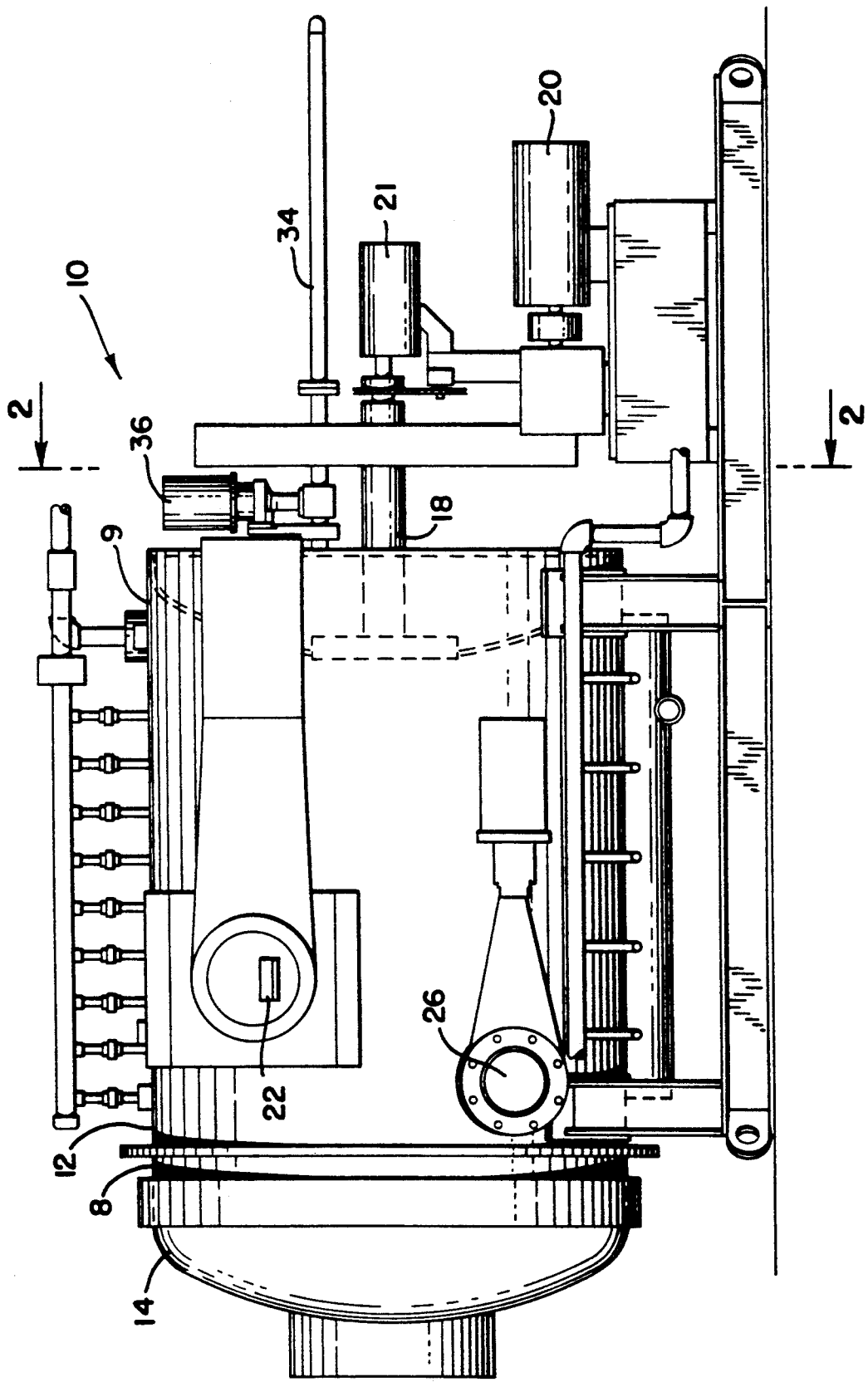

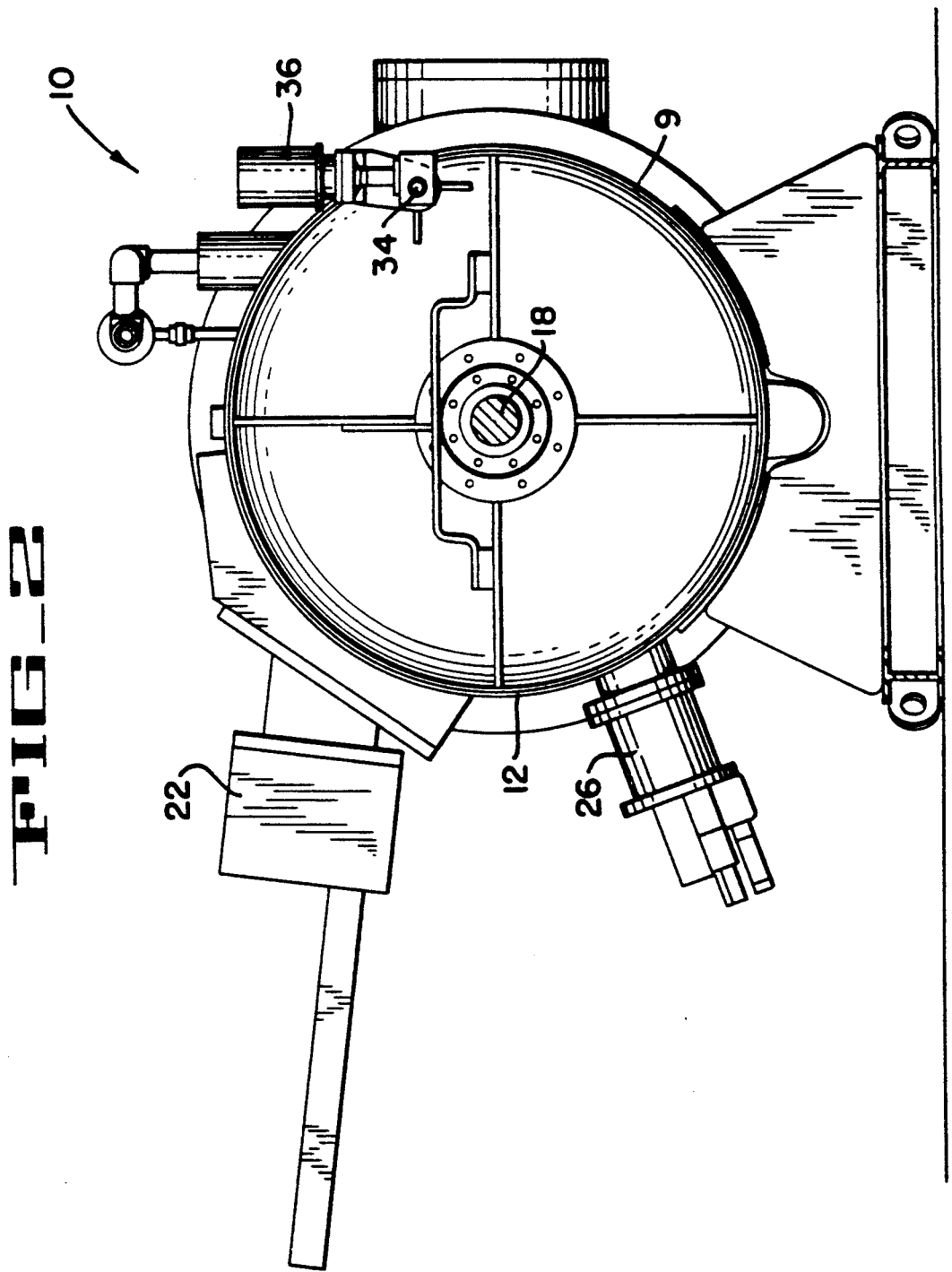
FIG_2

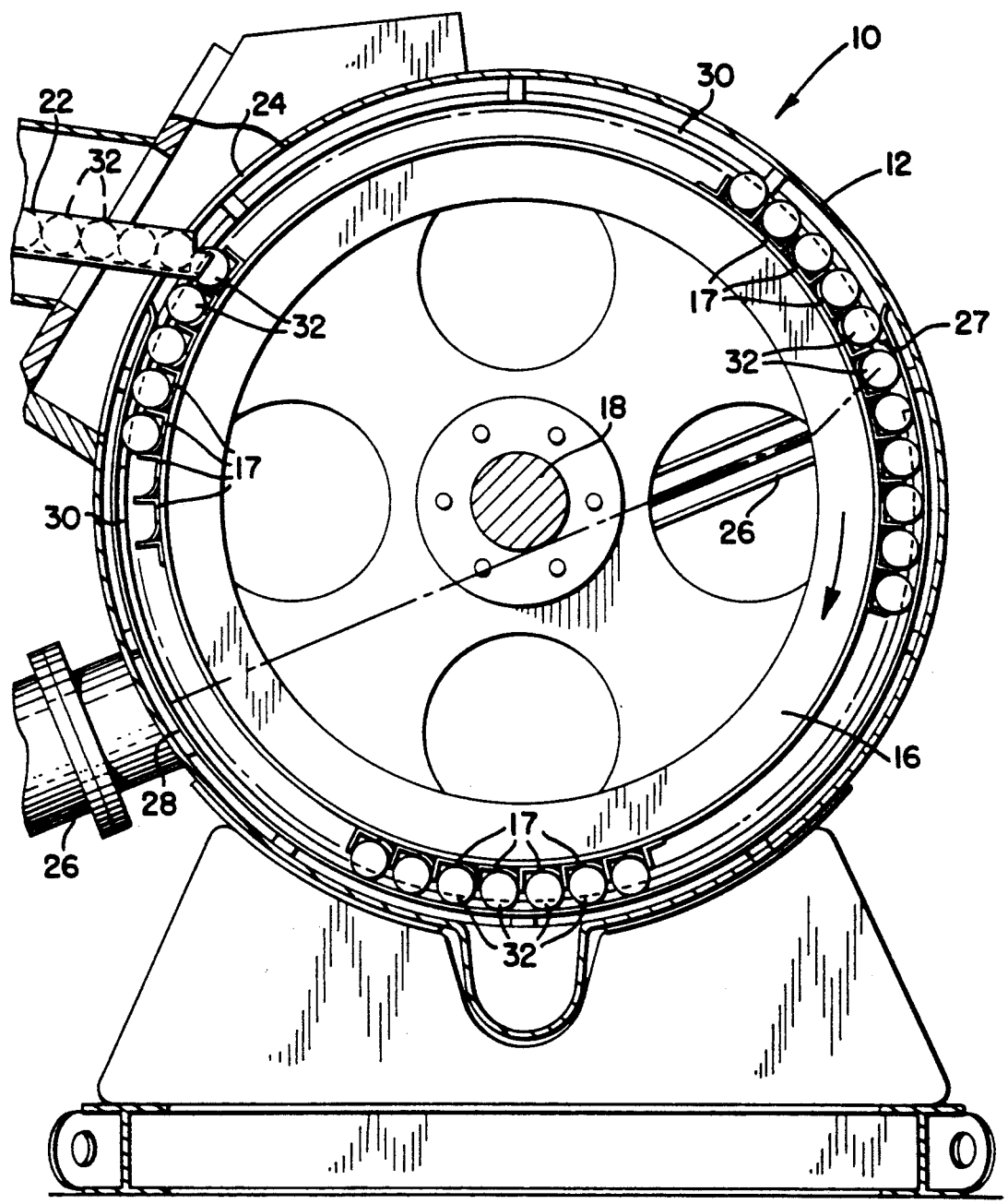
FIG_3

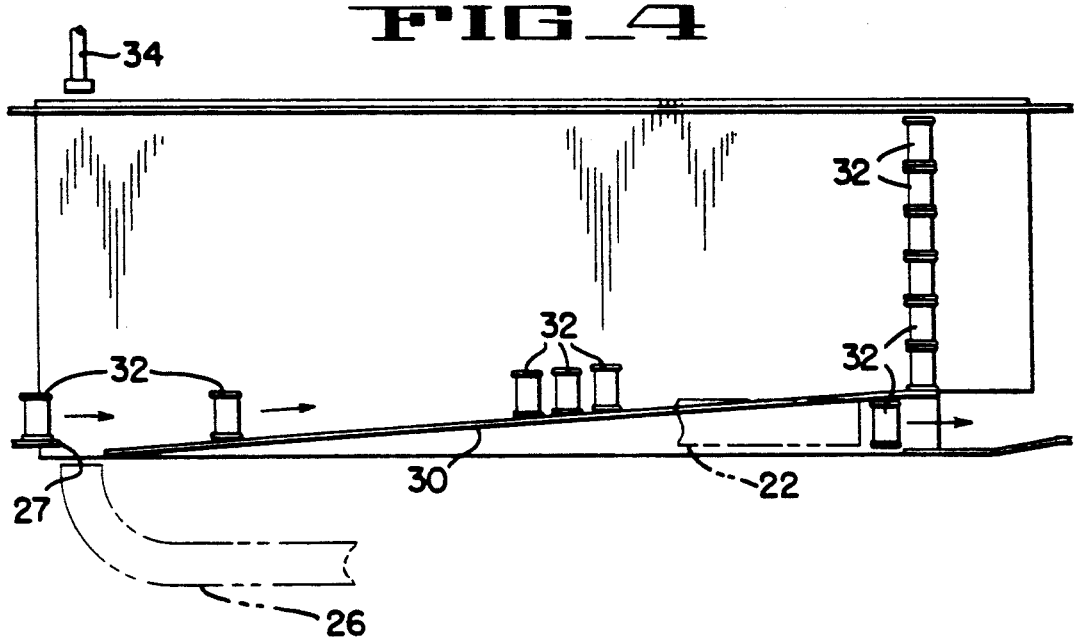
FIG_4
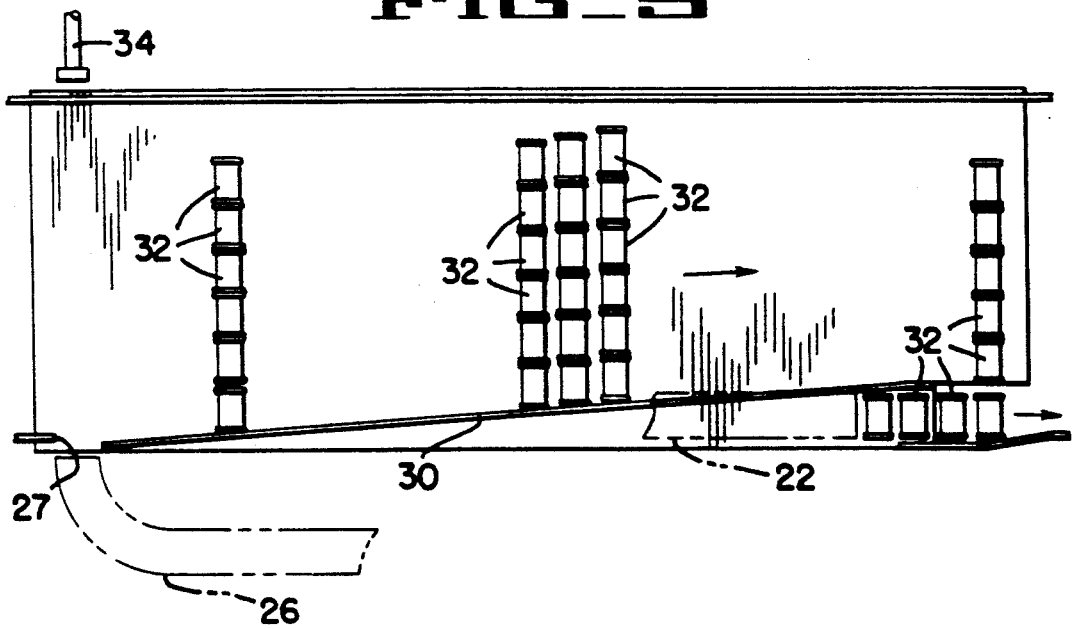
FIG_5

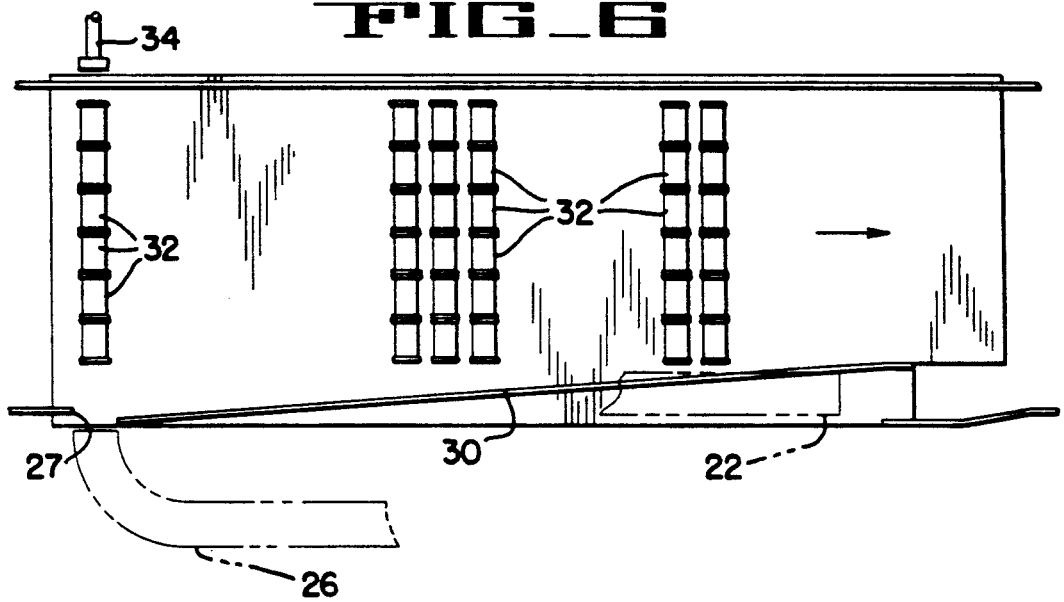
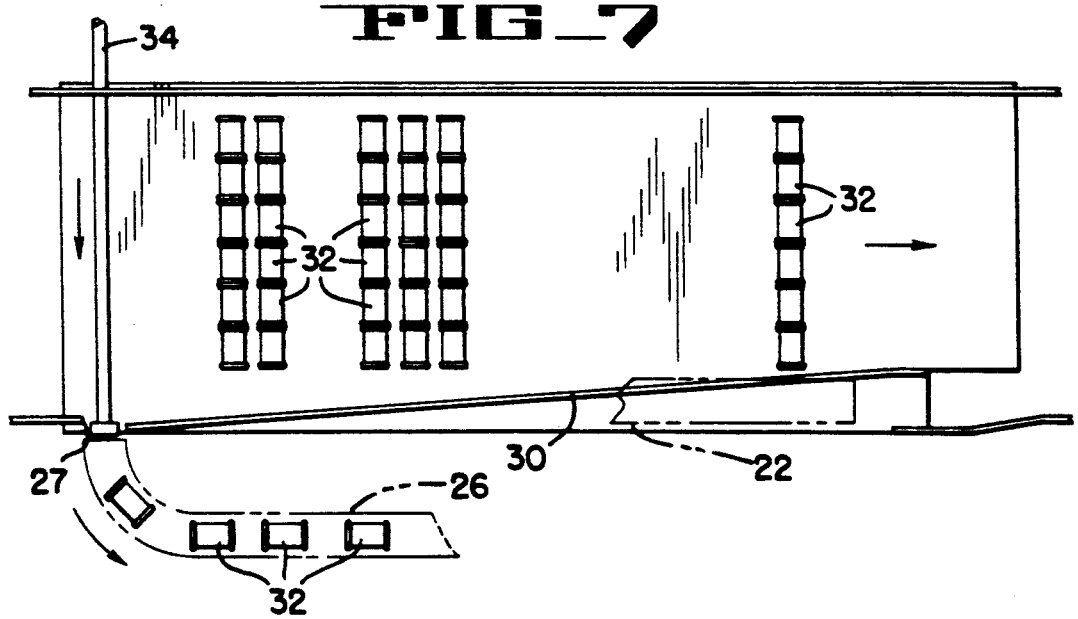

SINGLE SPIRAL ROTARY BATCH RETORT

A prior art rotary sterilizer is equipped with a continuous Tee profile spiral lead, attached to a shell and an angle profile lined reel. Containers are fed on one end of the shell into the spiral Tee's, and kept separated by a reel angle. The reel is being used to drive the containers continuous through the spiral. Containers are discharged on the opposing vessel end, thus creating a continuous progression of the containers through the sterilizer vessel. In the bottom quadrant, the container content is agitated by the rotating action of the container in each progressive form.

A steritort is an automatic batch retort simulator used to reproduce sterilization processes for a variety of sterilizer equipment. The steritort was especially developed to simulate the rotary sterilizer process. To simulate the rotating container agitation the steritort has been equipped with a roll plate.

Typical, a steritort is limited to hand loaded containers, into a reel, for a single turn. This machine, therefore, is a very small batch process sterilizer.

The invention provides a steritort which has an automatic loading and unloading capacity and which is able to handle larger batches than previous steritorts.

BRIEF DESCRIPTION OF THE DRAWINGS

FIG. 1 is a side view of preferred embodiment of the invention steritort.

FIG. 2 is an end view of the embodiment illustrated in FIG. 1 along line 2—2.

FIG. 3 is a cross sectional view of the embodiment illustrated in FIG. 1 along line 2—2 with part of the chamber removed.

FIG. 4 is a rolled out view of the embodiment illustrated in FIG. 1, illustrating some of the cans in a step of loading the steritort.

FIG. 5 is a rolled out view of the embodiment illustrated in FIG. 1, illustrating some of the cans in another step of loading the steritort.

FIG. 6 is a rolled out view of the embodiment illustrated in FIG. 1, illustrating some of the cans in a step of unloading the steritort.

FIG. 7 is a rolled out view of the embodiment illustrated in FIG. 1, illustrating some of the cans in another step of unloading the steritort.

FIG. 1 is a side view of preferred embodiment of the inventive steritort 10. The steritort 10 comprises a cylindrical chamber 12 with a first end 8 which is open and a second end 9 which is closed. Attached to the open first end 8 is a steritort door 14 which is able to seal the first end 8 of the chamber 12. A roll plate lines the bottom of the chamber 12.

FIG. 2 is a view of the embodiment illustrated in FIG. 1 along line 2—2 from the second end 9. FIG. 3 is a cross sectional view of the embodiment illustrated in FIG. 1 along line 2—2 with the second end 9 of the chamber 12 removed. FIGS. 4, 5, 6 and 7 are rolled out views of the chamber 12.

Inside of the chamber 12 is a reel 16 mounted on an axle 18, which extends through the second end 9 of the chamber 12 and which extends along the axis of the cylindrical chamber as shown. The axle 18 is mechanically connected to a drive apparatus 20. An encoder 21 is also connected to the axle 18 to measure the angular position of the axle 18. A plurality of angle bars 17 which extend the length of the reel 16 are placed around the circumference of the reel 16 forming a plurality of ridges extending the length of the reel 16.

A loading apparatus 22 extends through a loading port 24 in the chamber 12 to the inside of the chamber 12. An unloading apparatus 26 extends from the inside of the chamber 12 through an unloading port 28 to the outside of the chamber 12.

Near the end of the loading apparatus 22 inside the chamber is a flange 30 attached to the chamber 12 wall and which forms a spiral approximately equal to or less than two turn on the inside of the chamber 12 wall. A gap 27 in the flange is provided near the end of the unloading apparatus 26 inside the chamber 12.

A push rod 34 is mounted in a rack and pinion drive system 36 at the second end 9 of the chamber 12.

Some parts of the steritort 10, such as the loading apparatus and unloading apparatus are conventional parts of conventional rotary sterilizers.

In operation, the loading apparatus 22 provides cans 32 from outside the chamber 12 through the loading port 24 to the inside end of the loading apparatus 22. From the inside end of the loading apparatus 22, the cans 32 are provided to reel 16 in the region of the flange 30 forming the spiral. The drive apparatus 20 turns the axle 18 which turns the reel in a clockwise direction as indicated by the arrow in FIG. 3. After the reel 16 makes a complete turn a first row of cans is placed in the reel 16. The flange 30 forming the spiral progressively pushes the cans 32 into the reel 16 as the reel 16 turns in the clockwise direction. During its second rotation, a second row of cans 32 are provided in the reel 16, with the spiral pushing the cans 32 in the second row towards the second end 9 of the chamber 12 and the cans in the second row pushing the cans in the first row towards the second end 9 of the chamber 12. FIGS. 4 and 5 illustrate the loading process with six rows of cans 32 being provided to the reel 16, thus creating several columns of cans 32 with each column six cans 32 and each column being adjacent to an angle bar 17. The reel 16 may be loaded until its capacity has been reached, thus setting up a multi-turn loaded reel.

After loading is completed, the steritort 10 begins a sterilization process. Before the sterilization process begins, gates forming part of the loading apparatus 22 and unloading apparatus 26 are closed to seal the chamber 12. During the sterilization process, the cans 32 remain in their respective reel position and are processed in a batch. The relative rolling motion during continuous reel rotation is fully identical to that of a rotary sterilizer, thus creating a large rotary batch sterilizer simulator. During sterilization, the cans roll on the roll plate helping to simulate a rotary sterilizer, by providing a more efficient sterilization process.

After the sterilization process is completed, the unloading process begins. The encoder 21 measures the angular movement of the axle 18 so that the reel 16 rotation is stopped with a column of cans 32 adjacent to an end of the push rod 34, which is in a retracted position as shown in FIG. 6. The rack and pinion drive system 36 pushes the end of the push rod 34 from the second end 9 of the chamber 12 toward the first end 8 of the chamber 12, forcing the column of cans 32 adjacent to the end of the push rod 34 through the gap 27 in the spiral flange 30 and into the end of the unloading apparatus 26 inside the chamber 12 as shown in FIG. 7. Once the push rod 34 has pushed all of the cans 32 in a column into the unloading apparatus 26, the rack and pinion system 36 retracts the push rod 34 to the retracted position and the reel 16 is rotated so that a new column is adjacent to the push rod 34 is illustrated in FIG. 6. This process is repeated until all the columns of cans 32 are removed. All cans 32 that were progressively fed into the reel, were removed in an indexing mode. Emptying the reel 16 proceeds in steps equal to the number of angle bars 17 on the reel 16.

The gap 27 in the flange 30 forming the spiral may be used for manually placing cans 32 in the reel, when the steritort door 14 is open.

The resulting steritort provides a large capacity automatic rotary style batch retort is able to fully simulate rotary sterilization in all its details.

Although the preferred embodiment is described as processing cans, other objects such as bottles may be processed. In the invention, the flange should form a spiral which has less than two turns.

While a preferred embodiment of the present invention has been shown and described herein, it will be appreciated that various changes and modifications may be made therein without departing from the spirit of the invention as defined by the scope of the appended claims.

What is claimed is:

1. An apparatus for heating objects, comprising:
   a vessel having a cylindrically shaped chamber, a first end and a second end with an axis extending from the first end to the second end;
   a cylindrically shaped reel inside the cylindrically shaped chamber;
   means for rotating the cylindrically shaped reel;
   a flange forming a spiral on an inside of the cylindrically shaped chamber, wherein the spiral forms less than two turns, and wherein the spiral has a gap;
   means for providing objects from an outside of the vessel to the spiral inside of the vessel;
   a means for pushing the objects in a direction from the second end to the first end of the chamber and through the gap in the spiral; and
   means for moving objects which pass through the gap in the spiral to the outside of the vessel.

2. An apparatus, as claimed in claim 1, wherein the means for pushing the objects, comprises:
   a push rod with a length which is substantially parallel to the axis of the chamber; and
   means for driving the push rod in a direction substantially parallel to the axis of the chamber.

3. An apparatus, as claimed in claim 2, wherein the reel has a length substantially parallel to the axis of the chamber and an outer surface, and comprises, a plurality of ridges along the outer surface of the reel wherein each ridge extends substantially along the length of the reel.

4. An apparatus, as claimed in claim 3, wherein the means for providing objects from the outside of the vessel to the spiral inside of the vessel, comprises: a loading port in the vessel and a gate for providing a removable seal to the loading port, and wherein the means for moving objects which pass through the gap, comprises an unloading port in the vessel and a gate for providing a removable seal to the unloading port.

5. An apparatus, as claimed in claim 3, wherein the vessel further comprises a door at the first end of the vessel.

6. An apparatus, as claimed in claim 3, wherein the means for driving the push rod, comprises a rack and a pinion.

7. A method of heating objects in a batch mode, comprising the steps of:
   providing objects from an outside of a chamber having a first end and a second end to an inside of the chamber and adjacent to a reel inside the chamber and a flange which forms a spiral which is less than two turns on the inside of the chamber wherein the spiral has a first end a second end wherein the second end of the spiral is closer to the second end of the chamber;
   rotating the reel so the reel pushes the objects in a first direction around an exterior circumference of the reel and so that the flange pushes the objects in a second direction substantially parallel to an axis of the chamber toward the second end of the chamber;
   continuing to rotate the reel so that later added objects push earlier added objects in the second direction after the earlier added objects pass the second end of the spiral and so that the objects form columns;
   discontinuing the providing of objects from outside the chamber;
   heating the objects while the reel continues to push the objects in the first direction without a net movement in the second direction; and
   removing a column of objects, comprising the steps of:
      stopping the reel;
      driving a push rod against a column of objects pushing the column in a third direction, which is substantially antiparallel to the second direction and thus moving the column of objects through a gap in the spiral;
      removing the objects which pass through the gap in the spiral to the outside of the chamber;
      returning the push rod;
      rotating the reel so that a column of objects is adjacent to the push rod; and
      repeating the steps of removing a column of objects until the objects are removed from the chamber.

8. A method, as claimed in claim 7, further providing the steps of rotating a pinion to drive a rack which drives the push rod in the third direction and rotating the pinion to drive the rack which returns the push rod.

9. A method, as claimed in claim 8, wherein the step of providing objects from outside of the chamber comprises the step of transporting objects through a loading port in the chamber, and wherein the step of removing the objects comprises the step of transporting the objects through an unloading port in the chamber.

10. A method, as claimed in claim 9, further comprising the steps of:
    closing the loading port after discontinuing the providing of objects and before heating the objects;
    closing the unloading port before heating the objects;
    opening the loading port after heating the objects; and
    opening the unloading port after heating the objects and before removing the objects.

11. A method, as claimed in claim 7, wherein the step of rotating the reel, further comprises the step of rotating some of the objects.

12. A method, as claimed in claim 7, further comprising the step of cooling the objects.

13. A method, as claimed in claim 7, wherein the step of heating the object, heats the objects to a temperature sufficient to sterilize the objects.

14. A method, as claimed in claim 7, wherein the objects are containers with contents.

15. A method, as claimed in claim 14, wherein the step of heating the object, heats the objects to a temperature sufficient to sterilize the contents.

16. A method, as claimed in claim 14, wherein the step of heating the object, heats the objects to a predetermined temperature. ML:smb

* * * * *